No. 897,595. PATENTED SEPT. 1, 1908.
F. J. CROUCH & C. P. CHURCH.
MOTOR.
APPLICATION FILED JAN. 17, 1908.
2 SHEETS—SHEET 1.
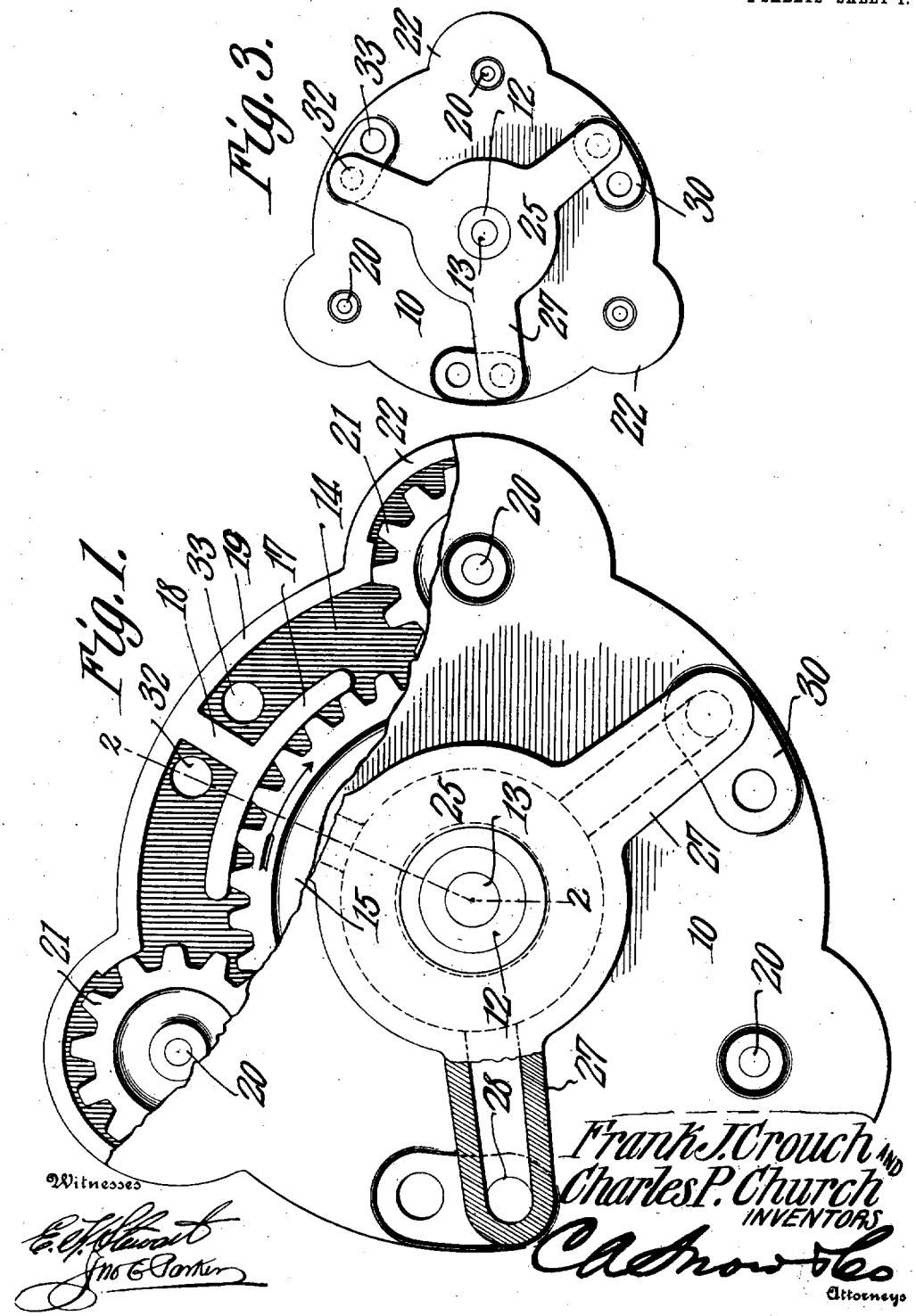

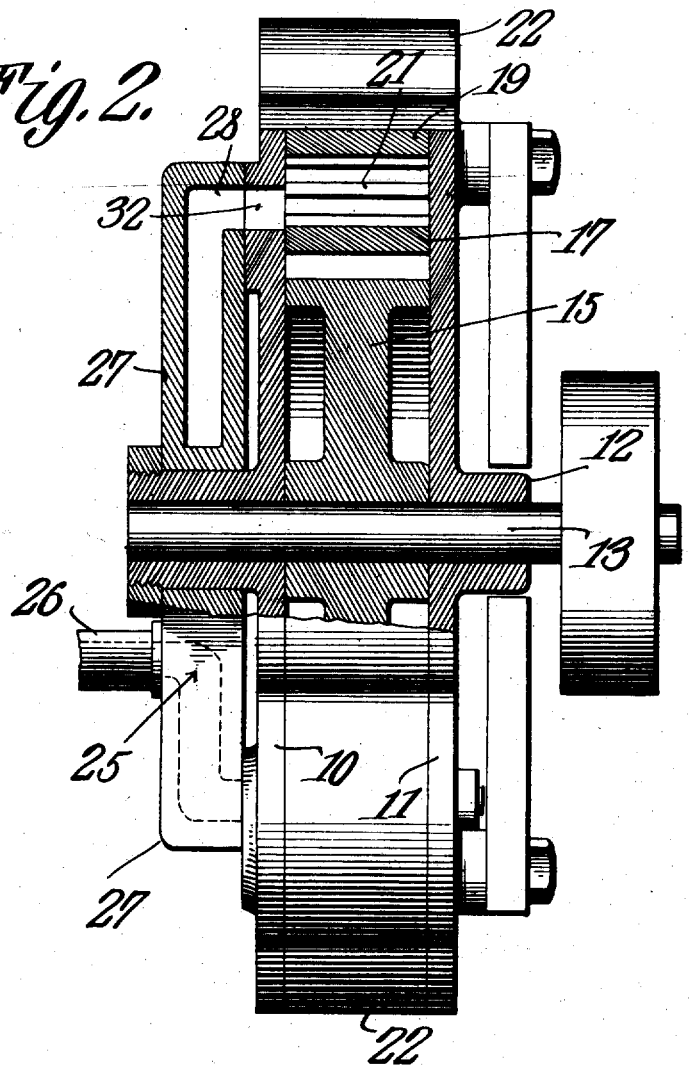

UNITED STATES PATENT OFFICE.

FRANK J. CROUCH AND CHARLES P. CHURCH, OF SEATTLE, WASHINGTON.

MOTOR.

No. 897,595.    Specification of Letters Patent.    Patented Sept. 1, 1908.

Application filed January 17, 1908. Serial No. 411,331.

*To all whom it may concern:*

Be it known that we, FRANK J. CROUCH and CHARLES P. CHURCH, citizens of the United States, residing at Seattle, in the county of King, State of Washington, have invented a new and useful Motor, of which the following is a specification.

This invention relates to fluid pressure motors, and has for its principal object to provide a motor of very simple construction which may be made to develop different speeds and power by alteration in the pressure of the actuating fluid.

A further object of the invention is to provide a fluid pressure motor that is especially adapted for use as a substitute for transmission gearing and link or other belts, so that power may be conveyed to any machine at a distance from the source of pressure, the device being especially advantageous for use in connection with automobile driving mechanism.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is an elevation, partly in section, of a motor constructed in accordance with the invention. Fig. 2 is a transverse sectional view of the same on the line 2—2 of Fig. 1. Fig. 3 is an elevation of the motor on a smaller scale than shown in the other figures.

Similar numerals of reference are employed to indicate corresponding parts throughout the several figures of the drawings.

The casing of the motor comprises a pair of heads 10 and 11, the central portions of which are enlarged to form cylindrical bearings 12 for the reception of a shaft 13, said shaft being connected in any suitable or convenient manner to the device to be driven. On this shaft is mounted a rotary piston 15 that is in the form of a gear wheel having epicycloidal teeth. The sides of the casing fit snugly against the opposite sides of the piston, and the periphery of the piston fits closely against a number of arcuate partitions 17, three of which are used in the present case, and each of these partitions extends on a curved line struck from the axis of the shaft. The central portion of each of the partitions 17 is connected to the outer fixed ring of the casing by means of a transverse partition 18, the spaces between the partitions and the outer ring forming inlet and exhaust chambers for the actuating fluid. The opposite heads 10 and 11 are provided with bearings for a series of shafts 20 carrying rotary abutment valves 21 that are in the form of pinions having epicycloidal teeth which mesh with the teeth of the main piston, the teeth being, respectively, shaped so as to closely interfit and prevent the passage of any fluid between them. The outer ring 18 of the casing is provided with semi-circular extensions 22 to receive the outer portions of these pinions, and the inner face of each end of the extension is machined and is designed to fit snugly against the teeth of the pinion, so that no liquid can pass around the outside of the pinion, except that which is carried between the teeth.

The ends of the partition 17 terminate some distance in advance of the rotary abutments, thus forming pressure spaces into which the teeth or blades of the rotary piston extend, and preferably there are three of such teeth or blades being acted upon simultaneously by the actuating fluid.

Mounted on the bearings 12 of the head 10 is a pressure chest 25 that preferably is circular in form and is connected by a pipe 26 to any suitable source of fluid pressure supply. Leading outward from this chest are hollow arms 27, the inner faces of which terminate in ports 28. The inner faces of the arms are finished, and are arranged to slide on machined bosses 30 that project from the side of the head 10, and through these bosses extend ports 32 and 33, either of which may be placed in communication with the inlet port 28, while the other forms an exhaust.

In operation, the fluid entering through the several ports 32 or 33, as the case may be, will fill the chamber formed at one side of the partition, and as the fluid will exert its pressure equally in all directions, the pressure will tend to turn each of the rotary abutments 21 in both directions, and the effect will thus be neutralized. The fluid under pressure will, also, act on the exposed tooth or blade of the main piston, and will force the same to travel in the direction indicated by the arrow, the speed and force exerted being in proportion to the degree of pressure of the fluid.

The device may be readily reversed by simply turning the main inlet chest, so as to move the arms into alinement with either set of ports.

The device is admirably adapted for the driving of machinery, taking the place of transmission gearing and belts, and may be used to advantage in automobile work. In practice it is preferred to employ a heavy oil or similar liquid which is placed in a tank, and held under pressure by pumping air thereinto, although water or any other liquid or fluid may be employed for the purpose.

We claim:—

1. In a rotary motor, a casing, a rotary piston arranged therein and provided with equi-distantly spaced teeth or blades, a revoluble abutment having teeth or blades corresponding to those of the piston and interfitting therewith to prevent the passage of the operating fluid between the two, a curved partition covering a portion of the teeth or blades of the piston, and with which the piston makes close contact, and a second partition dividing the space between the curved partition and the casing into inlet and escape chambers.

2. In a rotary motor, a casing, a rotary piston arranged therein and provided with equi-distantly spaced teeth or blades, a series of spaced rotary abutments arranged in the casing and provided with teeth or blades corresponding to those of the piston and intermeshing therewith to prevent the passage of fluid between them, the casing being provided with semi-circular projections to house the outer portions of the abutments and the inner faces of the walls of said projections being arranged to engage with the outer ends of the teeth or blades, a series of arcuate partitions arranged between and spaced from the abutments, the inner faces of said partitions being in engagement with the ends of the teeth or blades of the piston, and partitions extending from the curved partitions to the wall of the casing and dividing the space into inlet and exhaust chambers.

3. In a rotary motor, a casing, partitions arranged therein and dividing said casing into a series of inlet and exhaust chambers, each provided with a port, a rotary piston mounted in the casing and provided with peripheral teeth or blades, a series of rotary abutments having teeth or blades intermeshing with those of the piston, a revolubly adjustable pressure chest mounted at one side of the casing, and a series of distributing arms extending from the chest and arranged to register with the ports.

In testimony that we claim the foregoing as our own, we have hereto affixed our signatures in the presence of two witnesses.

FRANK J. CROUCH.
CHARLES P. CHURCH.

Witnesses:
F. E. CASE,
H. G. RUNKEL.